G. ANDERSON.
RUBBER PAVING FOR ROADS AND OTHER SURFACES.
APPLICATION FILED MAR. 19, 1918.

1,280,363. Patented Oct. 1, 1918.

Witnesses:
Chas. E. Whiteman
H. I. Siegel

Inventor:
George Anderson,
By his Att'y, T. H. Richards.

UNITED STATES PATENT OFFICE.

GEORGE ANDERSON, OF LONDON, ENGLAND.

RUBBER PAVING FOR ROADS AND OTHER SURFACES.

1,280,363.  Specification of Letters Patent.  Patented Oct. 1, 1918.

Application filed March 19, 1918. Serial No. 223,397.

*To all whom it may concern:*

Be it known that I, GEORGE ANDERSON, a subject of the King of Great Britain, residing in 24, 26, 28, and 30 Duke street, Aldgate, London, E. C. 3, England, have invented certain new and useful Improvements in and Relating to Rubber Paving for Roads and other Surfaces, of which the following is a specification.

This invention relates to improvements in rubber paving for roads and other surfaces and it has for its object to provide a block for this purpose which while presenting a surface which shall be resilient and noiseless shall at the same time be of such construction as to permit of its use for heavy traffic, and further to permit when desired of the ready removal and replacement of the blocks in the event of wear or their removal for any other purpose.

Blocks according to this invention are formed of three parts, of which the outer or wearing surface is composed of a layer of of india rubber beneath which is a metal plate to which the rubber is secured in any convenient manner and finally a cement body forming the base of the block and to which cement the metal plate is attached. By this means not only is a block produced presenting the aforementioned advantages, but it is possible should it be so desired to set the block in cement or the like, for example when used upon bridges or other like structures.

In order that the invention may be the better understood drawings are appended illustrating one form of the invention in which:—

Figure 1:
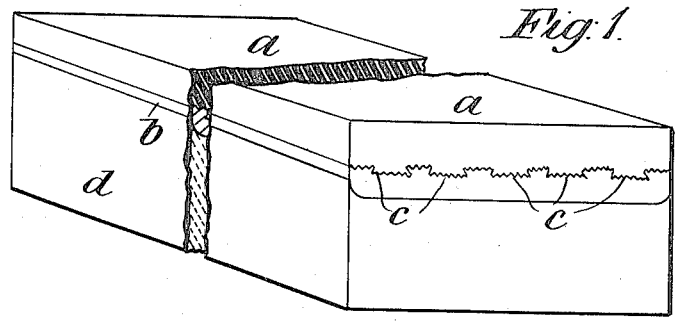
Figure 1 is a perspective view of a block.
Figure 2:
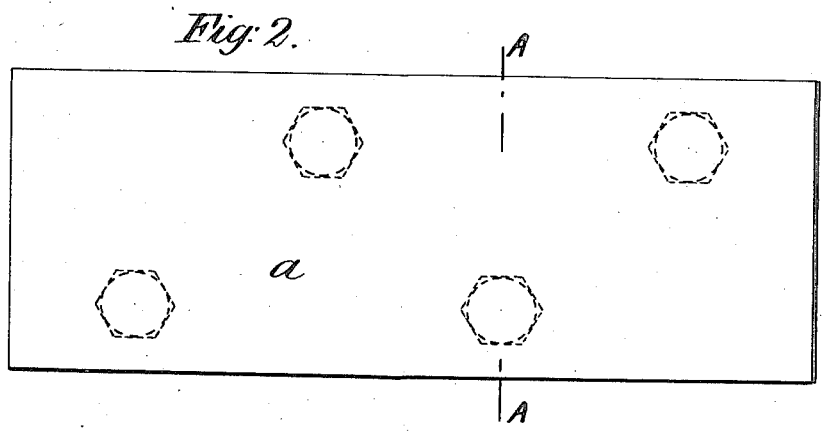
Fig. 2 is a plan.
Figures 3, 4:
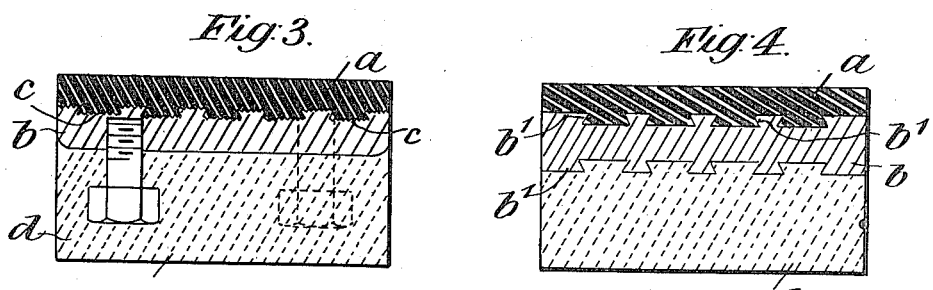
Fig. 3 is a cross section on line A A Fig. 1.
Fig. 4 is a cross sectional view showing a modified form of the invention.
Figure 5:
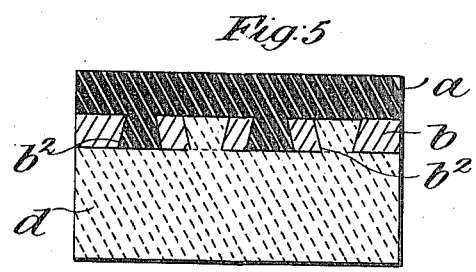
Fig. 5 is a similar view showing a further modification.

Referring to the accompanying drawings *a* indicates a block or sheet of india rubber which rubber is secured to a plate *b* of metal. The attachment of the rubber to the plate may be effected in any convenient manner for example by providing the plate with a series of recesses *c* the sides of said recesses being undercut as shown. To further secure the attachment of the rubber to the metal the surfaces of the plate in contact with the rubber are ribbed as shown or they may be scored or roughened in any suitable manner so as to form a key for the rubber. The rubber is applied while in a soft or doughy condition and is then vulcanized. *d* indicates a block or mass of concrete, cement, artificial stone or similar composition which block is molded upon the plate *b*, its attachment thereto being secured in any suitable manner, for instance by forming projections upon the plate having the vertical faces undercut as shown by $b^1$ Fig. 4, or as illustrated bolts may be tapped into the plate *b* the heads of which being embedded in the cement, or the like, secure the firm attachment of said cement to the plate *c*. Any other method or means of attachment may, however, be employed for either concrete or rubber, for example, the plate may be perforated and the tapered perforations as shown in Fig. 5 at $b^2$, the cement or rubber as the case may be, being applied to the plate will fill the perforations and form an effective key securing it to said plate.

Obviously instead of being of simple rectangular outline as shown the cement or the block as a whole may be shaped in accordance with the particular purpose for which it is intended.

Claims.

1. A paving block of three layers, including an outer sheet of rubber, a base of artificial stone, and an intermediate metal plate attached throughout its opposite faces with the said sheet and base.

2. A paving block for roadways and other surfaces comprising a sheet of rubber, recesses upon the inner face of said sheet of rubber, a metal plate, projections upon the upper surface of said plate engaging the recesses in the rubber, and a block of concrete or the like to which the metal plate is secured.

3. A paving block for roadways and other surfaces comprising a sheet of rubber, a metal plate to which said rubber is secured, projections upon the lower surface of said plate and a block of concrete or the like in which the said projections are embedded.

4. A paving block for roadways and other surfaces comprising a sheet of rubber, recesses upon the inner face of said rubber, a metal plate, projections upon said plate engaging the recesses in the rubber, projections upon the upper face of the metal plate engaging the recesses in the inner face of the rubber; projections upon the under surface of the metal plate, a block of concrete or the like in which the projections upon the under surface of the metal plate are secured.

5. A paving block for roadways and other surfaces, comprising a sheet of rubber, recesses upon the inner face of said rubber, a metal plate, projections upon said plate engaging the recesses in the rubber, screw threaded holes in said metal plate, bolts engaging said threaded holes, a block of concrete or the like in which the heads of the bolts are embedded.

In testimony whereof I affix my signature in the presence of two witnesses.

GEORGE ANDERSON.

Witnesses:
GEO. WALMSLEY,
JOHN GREGSON.